(12) United States Patent
Mayer et al.

(10) Patent No.: US 8,060,976 B2
(45) Date of Patent: Nov. 22, 2011

(54) PLASTIC ARTICULATED ARM

(75) Inventors: Stephan Mayer, Achern (DE); Jean-Marc Ritt, Strasbourg (FR)

(73) Assignee: Robert Bosch GmbH, Stuttgart (DE)

( * ) Notice: Subject to any disclaimer, the term of this patent is extended or adjusted under 35 U.S.C. 154(b) by 483 days.

(21) Appl. No.: 12/092,735

(22) PCT Filed: Oct. 16, 2006

(86) PCT No.: PCT/EP2006/067425
§ 371 (c)(1),
(2), (4) Date: May 6, 2008

(87) PCT Pub. No.: WO2007/054420
PCT Pub. Date: May 18, 2007

(65) Prior Publication Data
US 2008/0289135 A1    Nov. 27, 2008

(30) Foreign Application Priority Data
Nov. 9, 2005  (DE) .......................... 10 2005 053 395

(51) Int. Cl.
*B60S 1/40* (2006.01)
*B60S 1/34* (2006.01)
(52) U.S. Cl. ................. 15/250.351; 15/250.32
(58) Field of Classification Search ............ 15/250.351, 15/250.32, 250.31, 250.46, 250.44, 250.43
See application file for complete search history.

(56) References Cited

U.S. PATENT DOCUMENTS

| 4,445,249 A * | 5/1984 | Harbison et al. ........... 15/250.32 |
| 4,967,438 A * | 11/1990 | Arai et al. ................... 15/250.32 |
| 7,669,276 B2 * | 3/2010 | Verelst et al. .............. 15/250.32 |
| 2003/0110587 A1 * | 6/2003 | Ritt ........................ 15/250.352 |
| 2006/0021178 A1 | 2/2006 | Verelst et al. |

FOREIGN PATENT DOCUMENTS

| DE | 3619589 A1 | 12/1987 |
| FR | 2780013 A1 | 12/1999 |
| JP | 2000272478 | 10/2000 |
| JP | 2001315622 | 11/2001 |
| WO | 03/084790 * | 10/2003 |
| WO | 2005/000647 A1 | 1/2005 |

OTHER PUBLICATIONS

PCT/EP2006/067425 International Search Report.

* cited by examiner

*Primary Examiner* — Gary Graham
(74) *Attorney, Agent, or Firm* — Michael Best & Friedrich LLP

(57) ABSTRACT

The invention is based on a plastic articulated arm (10) with a connection part (12) for a wiper blade formed at its outer end by the side walls (14), wherein the connection part (12) can engage in a hook-in box (42) of the wiper blade and is provided in the side walls (14), which serve to guide the wiper blade laterally, with an open hub (16) for a pivot pin (44) of the wiper blade. It is proposed that a window (32) be provided at least in one side wall (14) of the connection part (12) in the longitudinal direction of the articulated arm (10), in which window is arranged a spring tongue (34) which projects outwardly beyond the side wall (14).

11 Claims, 1 Drawing Sheet

PLASTIC ARTICULATED ARM

BACKGROUND OF THE INVENTION

The invention is based on a plastic articulated arm for a windshield wiper.

Known windshield wipers comprise an articulated arm which is positioned with one end on a wiper shaft driven by a wiper motor. A wiper blade is articulated on its free, outer end. Said wiper blade generally has a multi-member support bracket system comprising a central bracket. Optionally, subordinate brackets are articulated thereto, of which at least several hold a wiper strip with claws at the ends thereof, as well as generally two spring tongues inserted into lateral grooves. Flat-bar wiper blades are also known which, instead of the support bracket system, have a bar-shaped, flexible support element. Said support element is connected via a connecting element to a connection part of an articulated arm in an articulated manner.

The articulated arm of the type to be considered, consists of plastics and has a U-shaped cross-sectional profile with reinforcing ribs which is open toward a vehicle aperture. Additionally, a connection part is formed at the outer end for coupling the wiper blade.

The connection part is inserted from above into a mounting box of the wiper blade, an open hub of the connection part encompassing a pivot pin arranged between the lateral walls of the mounting box, whilst the outer lateral walls of the connection part bear against the internal lateral walls of the mounting box. Thus the pivot pin mounted in the hub forms a joint which permits a pivoting movement between the articulated arm and the wiper blade, whilst the lateral walls of the connection part laterally guide the wiper blade.

Expediently, the articulated arm is produced in its final form in an injection-molding process, so that no subsequent processing is necessary. However, said components have tolerances required by manufacturing. Thus a clearance has to be provided between the rigid lateral walls of the connection part and the lateral walls of the mounting box. Said clearance increases during operation as a result of wear. A lateral clearance between the articulated arm and the wiper blade produces a rattling movement and has a negative effect on the wiping performance. Moreover, undesirable noises are generated as a result of the clearance. Said noises are transmitted undampened via the rigid guide to the articulated arm.

Such articulated arms are, for example, known from JP 2001315622 and JP 2000272478.

SUMMARY OF THE INVENTION

According to the invention, in at least one lateral wall of the connection part in the longitudinal direction of the articulated arm an aperture is provided, at the boundary thereof a spring tongue being arranged projecting outwardly beyond the lateral wall. As a result of the spring tongue pretensioned in the operating position, the wiper blade is guided without clearance during the entire service life, compensating for the wear. The damping function and the guiding function may be influenced by the dimensioning of the spring tongue and/or the spring tongues. Thus the windshield wiper is optimized in terms of noise, as the wiper blade is guided relative to the wiper arm without clearance and in a dampened manner. Moreover, the spring tongues are incorporated in the predetermined constructional space in the articulated arm and are positioned in the mounting box of the wiper blade, protected against damage.

The open hub is expediently arranged between the aperture and a front face at the end of the articulated arm, so that the wiper blade is easily guided, in particular toward its internal circle of movement, which is critical relative to vibrations at low wiping speeds. Moreover, the spring tongue may be formed via a spring bar at the boundary of the aperture on the lateral wall of the connection part extending transversely to the longitudinal direction of the articulated arm. The spring characteristics of the spring tongue may be determined as a result of the length, which in this position may be of sufficient size, and as a result of the strength of the spring bar. In this connection it is expedient that the spring bar is displaceable in a longitudinal guide relative to the boundary of the aperture, so that different effective spring lengths of the spring bar may be set.

In conditions of snow, ice and dirt, frequently large drive forces have to be transmitted to the wiper blade. So that in this case the spring tongue with its spring bar is not overloaded, in the longitudinal direction on both sides of the aperture, fixed guide faces are provided on the lateral wall of the connection part which are connected via transverse webs to fixed guide faces on the other lateral wall. Thus a secure guiding of the wiper blade is ensured even in difficult operating conditions. Moreover, on the inner face of the spring tongue a stop is arranged at a short distance therefrom, in order to limit the spring path of the spring tongue inwardly, and thus to protect from damage. The stop is advantageously arranged on a central web of the connection part.

According to a further embodiment of the invention, the spring tongue at its free end comprises a lateral bearing surface which projects outwardly relative to the remaining lateral contour of the spring tongue. As a result, a defined support relative to the mounting box is achieved, so that defined spring paths and spring forces of the spring tongue result.

The spring tongue may, moreover, be provided on an adapter, which is releasably fastened to the connection part of the articulated arm. The spring tongue thus grips through the aperture and is supported in the mounted state on the lateral walls of the mounting box of the wiper blade.

BRIEF DESCRIPTION OF THE DRAWINGS

Further advantages result from the following description of the drawings. Embodiments of the invention are shown in the drawings. The drawings, the description and the claims contain numerous features in combination. The person skilled in the art will also expediently consider the features individually and combine them into meaningful further combinations.

In the drawings.

DETAILED DESCRIPTION

Figure 1:
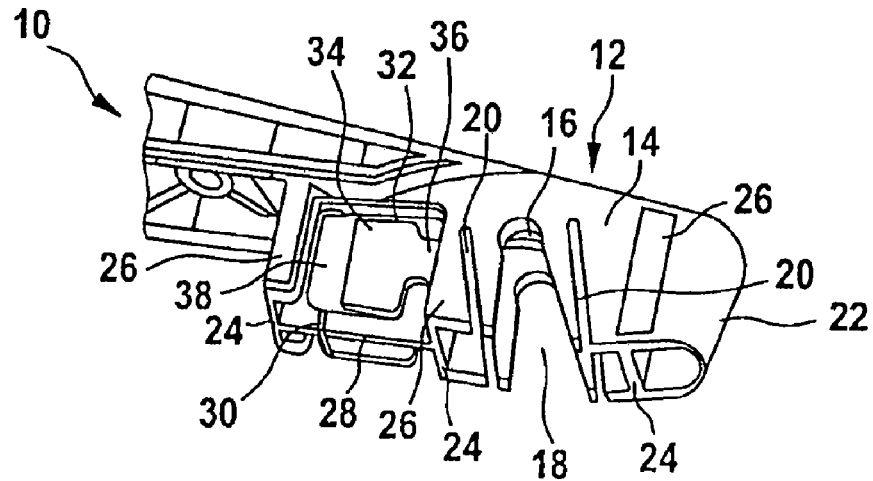
FIG. 1 shows a perspective view of one end of an articulated arm obliquely from below.

A plastic articulated arm 10 has at its free end a connection part 12 which is formed on the articulated arm in an injection-molding process. An open hub 16 is provided in lateral walls 14 of the connection part 12, which in the installed state encompasses a pivot pin 44 of a wiper blade. The opening for mounting the pivot pin 44 is denoted by 18. Slots 20 are arranged to the side of the opening 18 in the lateral walls 14, so that the wall parts may resiliently yield between the slots 20 and the opening 18 during mounting. Toward the free end, the lateral walls 14 are connected to one another by a curved front wall 22.

Figure 2:
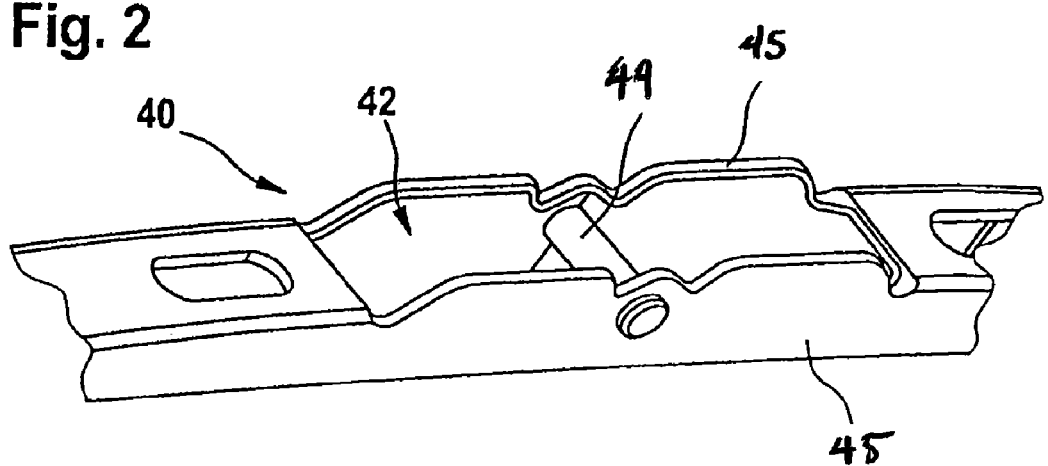
FIG. 2 shows a perspective view of a mounting box obliquely from above and FIG. 3 shows a view of a connection part of an articulated arm with an adapter from below.

On the side of the hub 16 remote from the front wall 22, apertures 32 are arranged in the lateral walls 14, which are open toward the lower side which faces a vehicle window, not shown, during operation. On both sides of the aperture 32 fixed guide faces 26 are provided on the lateral walls 14, which in the installed state have less clearance from lateral walls 45 of a mounting box 42 of a wiper blade. FIG. 2 shows by way of example a mounting box 42 on a central bracket 40 of a wiper blade.

In the region of the aperture 32, spring tongues 34 are arranged, connected via spring bars 36 to the connection part 12. The connection may be rigid, as the spring bar 36 at the boundary of the aperture 32 is formed on the connection part 12, but it may also be releasable, as the spring bar 36 is displaceably held on the connection part 12 in a longitudinal guide. As a result of the longitudinal displacement the effective spring length of the spring bar 36 is altered so that the spring characteristics of the spring tongue 34 may be adjusted. At the end of the spring tongue 34 remote from the spring bar 36 a bearing surface 38 is located which projects outwardly from the aperture 32 and relative to the remaining contour of the spring tongue 34. Thus a defined spring length between the support of the spring bar 36 is produced on the connection part 12 and the bearing surface 38. In order to protect the spring tongues 34 from damage, the spring paths thereof are inwardly limited by stops 30 which are provided on a central web 28 of the connection part 12 and/or an adapter 46 inserted therein.

Figure 3:
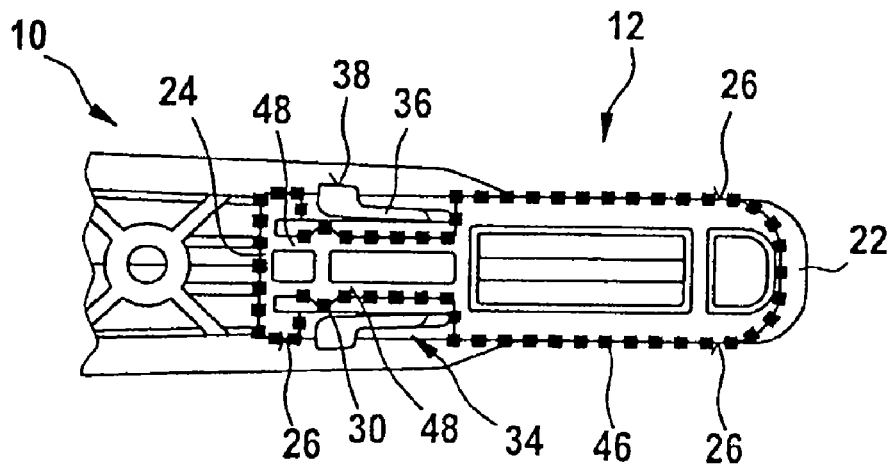

An embodiment is shown in FIG. 3 in which the adapter 46 is inserted into the connection part 12. In this case, the spring tongue 34 is connected via the spring bar 36 to the adapter 46, in the installed state the bearing surfaces 38 projecting through the aperture 32. The spring tongues 34 may be supported inwardly on stops 30, which are arranged on a double central web 48 of the adapter 46.

The invention claimed is:

1. A plastic articulated arm (10) comprising a connection part (12) for a wiper blade formed at its outer end by lateral walls (14), the connection part (12) being able to engage in a mounting box (42) of the wiper blade and having, in the lateral walls (14) which serve for the lateral guiding of the wiper blade, an open hub (16) for a pivot pin (44) of the wiper blade, characterized in that in at least one lateral wall (14) of the connection part (12) in the longitudinal direction of the articulated arm (10) an aperture (32) is provided, in which a spring tongue (34) is arranged projecting outwardly beyond the lateral wall (14), an outwardly projecting lateral surface of the spring tongue (34) engaging against an inner surface of an associated lateral wall of the mounting box (42).

2. The articulated arm (10) as claimed in claim 1, characterized in that on an inner face of the spring tongue (34) a stop (30) is arranged at a short distance therefrom, in order to limit the spring path of the spring tongue (34).

3. The articulated arm (10) as claimed in claim 1, characterized in that the spring tongue (34) at its free end comprises a lateral bearing surface (38) which projects outwardly relative to the remaining lateral contour of the spring tongue (34).

4. The articulated arm (10) as claimed in claim 1, comprising an adapter (46) for the wiper blade inserted into the connection part (12), characterized in that the spring tongue (34) is provided on the adapter (46) together with a spring bar (36).

5. A plastic articulated arm (10) comprising a connection part (12) for a wiper blade formed at its outer end by lateral walls (14), the connection part (12) being able to engage in a mounting box (42) of the wiper blade and having, in the lateral walls (14) which serve for the lateral guiding of the wiper blade, an open hub (16) for a pivot pin (44) of the wiper blade, characterized in that in at least one lateral wall (14) of the connection part (12) in the longitudinal direction of the articulated arm (10) an aperture (32) is provided, in which a spring tongue (34) is arranged proiectinq outwardly beyond the lateral wall (14), and
characterized in that the open hub (16) is arranged between the aperture (32) and a front face (22) at the end of the articulated arm (10), and the aperture (32) is open at its lower boundary, the spring tongue (34) being fastened via a spring bar (36) to a boundary of the aperture (32) extending transversely to the longitudinal direction of the articulated arm (10).

6. The articulated arm (10) as claimed in claim 5, characterized in that the spring bar (36) is displaceable in a longitudinal guide relative to the boundary of the aperture (32).

7. The articulated arm (10) as claimed in claim 6, characterized in that in the longitudinal direction on both sides of the aperture (32) fixed guide faces (26) are provided on the lateral wall (14), which are connected via transverse webs (24) to fixed guide faces (26) on the other lateral wall (14).

8. The articulated arm (10) as claimed in claim 7, characterized in that on the inner face of the spring tongue (34) a stop (30) is arranged at a short distance therefrom, in order to limit the spring path of the spring tongue (34).

9. The articulated arm (10) as claimed in claim 8, characterized in that the spring tongue (34) at its free end comprises a lateral bearing surface (38) which projects outwardly relative to the remaining lateral contour of the spring tongue (34).

10. The articulated arm (10) as claimed in claim 9, comprising an adapter (46) for the wiper blade inserted into the connection part (12), characterized in that the spring tongue (34) is provided on the adapter (46) together with the spring bar (36).

11. A plastic articulated arm (10) comprising a connection part (12) for a wiper blade formed at its outer end by lateral walls (14), the connection part (12) being able to engage in a mounting box (42) of the wiper blade and having, in the lateral walls (14) which serve for the lateral guiding of the wiper blade, an open hub (16) for a pivot pin (44) of the wiper blade, characterized in that in at least one lateral wall (14) of the connection part (12) in the longitudinal direction of the articulated arm (10) an aperture (32) is provided, in which a spring tongue (34) is arranged proiectinq outwardly beyond the lateral wall (14), and
characterized in that in the longitudinal direction on both sides of the aperture (32) fixed guide faces (26) are provided on the lateral wall (14), which are connected via transverse webs (24) to fixed guide faces (26) on the other lateral wall (14).

* * * * *